April 30, 1935. S. C. CLARK 1,999,441
MAT AND METHOD OF MANUFACTURING IT
Filed July 18, 1932
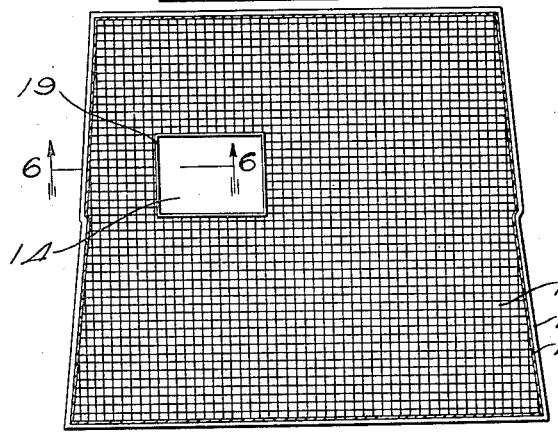
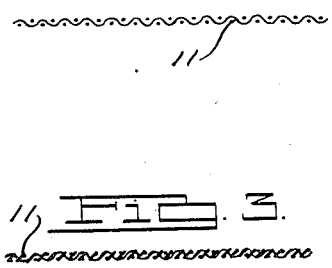
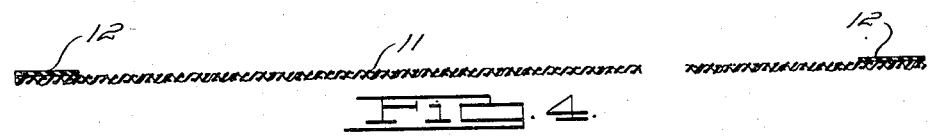
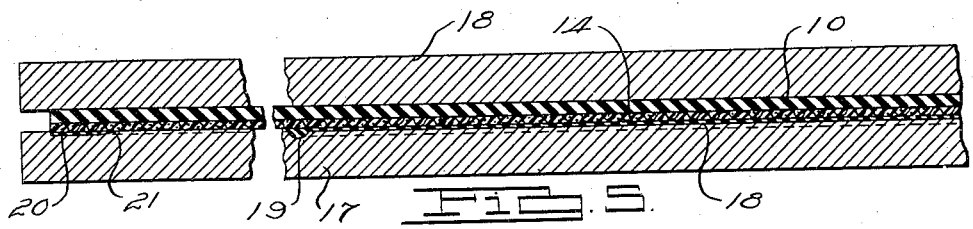
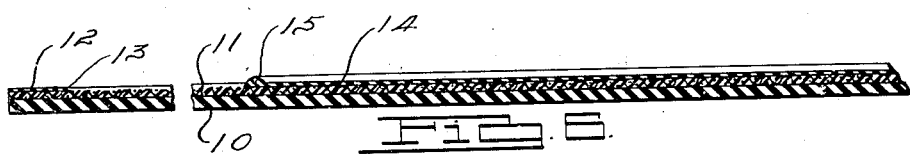
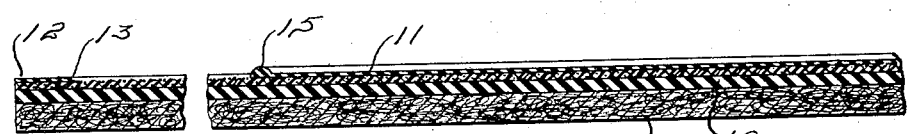
INVENTOR
Samuel C. Clark.
BY
Harness, Dickey, Pierce & Haun
ATTORNEYS Patented Apr. 30, 1935

1,999,441

UNITED STATES PATENT OFFICE 1,999,441

MAT AND METHOD OF MANUFACTURING IT

Samuel C. Clark, Pontiac, Mich., assignor to Baldwin Rubber Company, a corporation of Michigan Application July 18, 1932, Serial No. 623,073

4 Claims. (Cl. 154—2)

The invention relates generally to laminated articles and it has particular relation to an automobile floor mat and method of manufacturing it.

One object of the invention is to provide a floor mat which is inexpensive in construction, and durable and efficient to an improved degree.

Another object of the invention is to provide a floor mat which is substantially waterproof while still obtaining the advantages of the conventional floor mat of the fabric type.

Another object of the invention is to provide a laminated floor mat of vulcanized construction, which simulates the conventional fabric type of stitched floor mat.

Another object of the invention is to provide a method of manufacturing a floor mat in an inexpensive manner to the end that floor mats of the general character set forth above may be manufactured economically and efficiently.

Other objects of the invention will be apparent from the following description taken in conjunction with the drawing, wherein:

Figure 1 is a plan view of a floor mat constructed according to one form of the invention;

Fig. 2 is a fragmentary cross-sectional view of a layer of fabric that may be employed, prior to treating the fabric with rubber;

Fig. 3 is a similar view of the fabric, after it has been treated with a latex or rubber solution;

Fig. 4 is a cross-sectional view of the fabric after a narrow strip of rubber has been disposed along the margin thereof;

Fig. 5 is a cross-sectional view of a mold illustrating the manner in which the mat as finally assembled, is vulcanized;

Fig. 6 is a cross-sectional view of the mat subsequent to vulcanization:

Fig. 7 is a cross-sectional view of a mat constructed according to another form of the invention in which a layer of soft, cushioning material is applied to the bottom or rubber side of the mat.

Referring to Figs. 1 and 6, the mat illustrated comprises a base layer of rubber 10, and an upper layer of fabric 11 bonded to the base layer by vulcanization. On the upper surface of the fabric 11, and around the margin thereof, a thin strip of rubber 12 is provided with is likewise bonded to the fabric by vulcanization. The inner edge of this strip of rubber 12 is beveled toward the fabric as indicated at 13 to avoid any sharp edge at this point and in general to improve the appearance of the mat. Preferably along this beveled surface or adjacent thereto, the strip of rubber 12 during vulcanization is provided with indentations, simulating a threaded seam running around the margin of the mat, so that in appearance the strip 12 seems to be sewn to the fabric. Some fabric mats have a narrow strip of closely woven fabric running around the edge thereof which is sewn to the body of the mat and this narrow strip of rubber having the imitation seam simulates a mat of the last-mentioned character. Inwardly of the margin, a rectangular layer of rubber 14 is vulcanized to the upper surface of the fabric 11 and preferably around the edge thereof, a bead 15 is provided to avoid a sharp edge and to improve the appearance of the mat. This layer of rubber 14 as best shown by Fig. 1 is so located on the mat that in use, it is adapted to support the heels of the operator's shoes during ordinary positioning of the meet in manipulating the foot pedals of the vehicle. This rubber naturally will prevent excessive wear caused by the heels of the operator engaging the mat and particularly is useful in the case of the woman driver who ordinarily wears high and sharp heels.

In manufacturing a mat of this character, it is preferred to take the fabric 11 as shown by Fig. 2, and pass it through a latex solution or a solution of rubber and a solvent therefor. This step in the manufacture largely saturates and thinly coats all of the exposed fibers in the fabric with rubber and thereby renders the fabric substantially waterproof although to outward appearances, no rubber is ordinarily visible. Fig. 3 has been shown to illustrate the fabric as thus treated with the latex solution or rubber solution in which a solvent is employed.

After the fabric has thus been treated, the narrow strip of unvulcanized rubber 12 is disposed around the margin of the fabric and it will be understood that the unvulcanized condition of this narrow strip of rubber will cause it to adhere firmly to the fabric when it is once disposed in proper position. In vulcanizing the mat, a mold is employed as shown by Fig. 5, comprising a lower form 17 and an upper form 18. The lower form has a recess 18 for accommodating the rectangular layer of rubber 14, and a groove 19 around this recess for forming the bead 15. Initially, the layer of rubber 14 may be disposed in the recess 18 and over the groove 19 and then the fabric with the narrow strip of rubber 12 around it may be disposed on the lower form 17 and over the strip 14. For accommodating the strip 12, the lower form 17 is provided with a recess 20 which is tapered at its inner edge as indicated at 21 to provide the beveled surface 13 previously mentioned. The base layer of initially unvulcanized rubber 10 may be disposed on the back side of the fabric prior to inserting it on the mold or after the fabric is disposed on the lower mold form. During vulcanization, the several parts of the mat are strongly bonded together by vulcanization of the rubber, and during this operation in which pressure of course is employed, the bead 19 and beveled surface 21 are formed. The form 17 preferably has along the beveled surface 21 or adjacent thereto, indentations for forming the thread or seam simulation in the finished mat.

In a mat of this character, it is apparent that the base layer of rubber 10 will firmly support and maintain the shape of the mat while still providing flexibility and that the fabric will be strongly bonded thereto to maintain the unitary character of the construction. The narrow strip of rubber 12 prevents fraying of the edges of the fabric and at the same time gives to the mat the appearance of the ordinary fabric type of mat construction wherein a narrow binding strip is sewn to a fabric base. The bevel 13 and head 15 not only enhance the appearance of the mat but prevent any sharp edges that would tend to catch on the edge of the shoes of any one in the vehicle.

The fabric upper layer is ordinarily desirable in a mat construction because it lends a comfortable appearance to the interior of the vehicle and also gives a soft base to the floor thereof. Treating this fabric with latex or rubber in a solvent, substantially renders it waterproof and enables securing a stronger bond to the base layer of rubber 10, while at the same time retaining the advantages of the fabric mat both from the utility and appearance points of view. Treating the fabric 11 with the rubber solution also is advantageous in preventing dirt and the like from becoming strongly lodged in the fabric. Furthermore, a mat of this character may be washed with water without the disadvantage of the fabric absorbing the water appreciably and the necessity of a long period for drying out the fabric.

In the construction shown by Fig. 7, a layer of felt 22, for example, may be secured to the lower surface of the rubber layer 10 by cementing or by vulcanization. If it is vulcanized to the layer 10, the felt may be disposed in a mold along with the mat shown by Fig. 6, and vulcanized to the base layer 10, but in this case, the felt probably would be compressed to such extent that it would be desirable to subsequently revive its cushioning properties and this may be effected by throwing a jet of steam on the compressed felt, following removal of the mat from the mold, to loosen it up and render it more compressible.

Although more than one form of the invention has been illustrated and described in detail, it will be apparent to those skilled in the art that various modifications may be made without departing from the scope of the appended claims.

What I claim is:

1. The method of manufacturing a mat which comprises treating woven fabric with a liquid rubber solution, disposing a narrow strip of rubber around a face margin of the fabric, superimposing the assembly over a mold form having a section of rubber located in a cavity therein, with the rubber strip next to the form, applying a rubber backing to the fabric, and vulcanizing the assembly under pressure.

2. The method of manufacturing a mat which comprises treating woven fabric with a liquid rubber solution, disposing a narrow strip of rubber around the face margin of the fabric, superimposing the assembly over a mold form with the rubber strip next to the form, applying a rubber backing to the fabric and vulcanizing the assembly under pressure.

3. The method of manufacturing a mat which comprises treating woven fabric with a liquid rubber solution, superimposing the assembly over a mold form having a section of rubber located in a cavity therein, applying a rubber backing to the fabric and vulcanizing the assembly under pressure.

4. The method of manufacturing a mat which comprises treating woven fabric with a liquid rubber solution, applying a narrow strip of rubber around a face margin of the fabric, applying a rubber backing over the opposite face of the fabric and then vulcanizing the assembly.

SAMUEL C. CLARK.